J. COPELAND.
Corn Coverers and Cultivators.
No. 157,196. Patented Nov. 24, 1874.
Fig. 1.
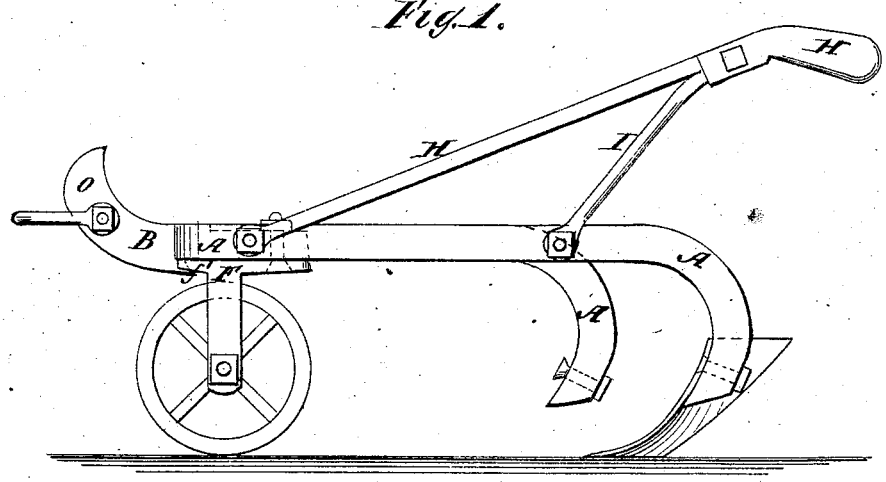
Fig. 2.
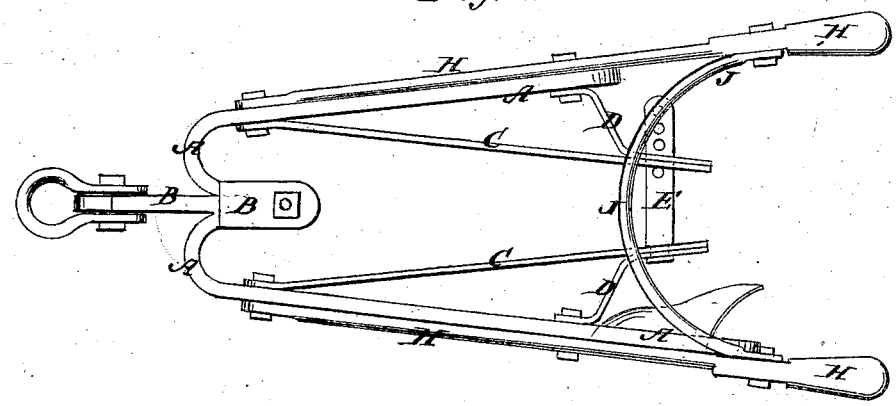
Fig. 3.    Fig. 4.   Fig. 5.      Fig. 6.
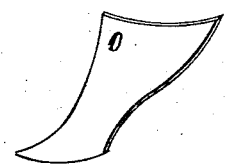 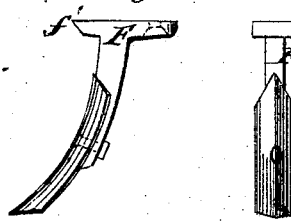 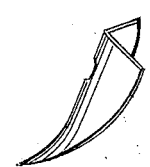
WITNESSES:
E. Wolff
N. F. Terry
INVENTOR:
J. Copeland
BY
ATTORNEYS.

UNITED STATES PATENT OFFICE.

JAMES COPELAND, OF BLOOMINGDALE, OHIO.

IMPROVEMENT IN CORN COVERERS AND CULTIVATORS.

Specification forming part of Letters Patent No. 157,196, dated November 24, 1874; application filed October 10, 1874.

*To all whom it may concern:*

Be it known that I, J. COPELAND, of Bloomingdale, in the county of Jefferson and State of Ohio, have invented a new and useful Improvement in Combined Corn-Coverer, Cultivator, and Double-Shovel Plow, of which the following is a specification:

Figure 1 is a side view of my improved implement arranged for use as a corn-coverer. Fig. 2 is a top view of the same. Fig. 3 is a detail view of one of the covering-plow plates. Fig. 4 is a side view of one of the cultivator-plow plates, shown as attached to the detachable standard. Fig. 5 is a front view of the same. Fig. 6 is a side view of one of the shovels.

Similar letters of reference indicate corresponding parts.

The invention relates to the construction of the frame of the implement to adapt it for adjustment and for attachment of different devices, as hereinafter described.

A are the beams, one of which is made shorter than the other, and the rear ends of which are curved downward into proper positions to receive the plow-plates, which may be turn-plates, as shown in Figs. 1, 2, and 3, or cultivator-plates, as shown in Figs. 4 and 5, or shovel-plates, as shown in Fig. 6, or of any other desired form, according to the circumstances under which, and the purposes for which, the implement is to be used. The forward ends of the beams A are curved inwardly, and are rigidly attached to, or formed solid with, the draw bar or beam B. The curved forward parts of the beams A are made of such a size as to have the rigidity necessary to sustain the draft-strain of the plows, and, at the same time, sufficient elasticity to enable the rear ends of said beams to be sprung toward or from each other in adjusting the plows at the desired distance apart. The forward part of the draw-beam B is curved upward, and has several holes formed in it at different elevations, to enable the point of draft attachment to be adjusted higher or lower to cause the plows to work deeper or shallower in the ground, as may be required. To the inner sides of the beams A, at or near the end of the curves of their forward ends, are secured, by bolts or rivets, the forward ends of two spring-bars, C, which incline slightly inward, and project to the rearward, until their rear ends are about midway between the ends of the two beams A. To the rear ends of the springs C are attached the inner ends of the two springs D, the outer ends of which are secured by bolts or rivets to the rear parts of the beams A. To the rear end of one pair of the springs C D is secured a bar, E, which passes through a hole in the rear ends of the other pair of springs C D. The bar E has several holes formed in it to receive a pin for securing the beams A in place when adjusted. F is a right-angled standard, the upper arm of which is bolted to the under side of the rear part of the draw-beam B. Upon the salient angle of the standard F is formed a wedge-shaped toe or projection, *f'*, which enters a similarly-shaped notch in a shoulder upon the lower side of the said draw-beam B. The other or vertical arm of the standard F is slotted to receive the wheel G that supports the forward part of the machine when adjusted as a coverer or double-shovel plow.

When the machine is to be used as a cultivator, the standard F is removed and replaced by a similar standard, the lower arm of which is without a slot, is curved slightly forward, and has a hole formed through it to receive a bolt for holding a cultivator-plow.

H are the handles, the forward ends of which are bolted or riveted to the forward parts of the beams A, and which are supported at the proper height by braces I, the lower ends of which are bolted or riveted to the rear parts of the said beams A.

The handles H are connected together by a curved rod or bar, J, as shown in Fig. 2.

Having thus described my invention, what I claim as new, and desire to secure by Letters Patent, is—

The combination of the beams A A with curved flexible front ends, and the draw-beam B, having a notched recess, with the spring-braces C D, the perforated cross-bar E, and the standard F, having a wedge-shaped seat at its upper end, forming an adjustable cultivator, adapted to receive a wheel when used as a coverer, or shovels of various shapes when used as a cultivator or shovel-plow, substantially as shown and described.

JAMES COPELAND.

Witnesses:
JNO. B. SIMERAL,
ROBERT BUTCHER.